R. G. GOLDMAN.
ROLLER BEARING.
APPLICATION FILED DEC. 19, 1917.
1,286,290.
Patented Dec. 3, 1918.
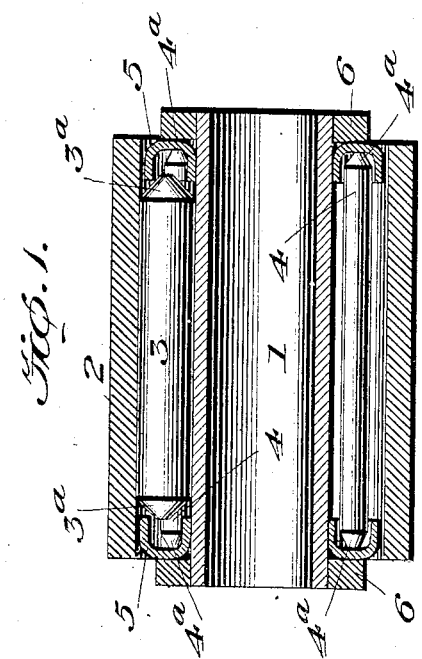
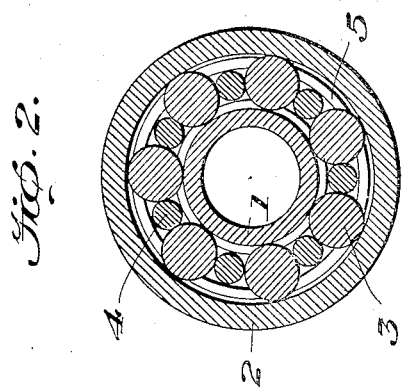
Witnesses
Inventor
Rutherford G. Goldman
By Vernon E. Hodges
his Attorney

UNITED STATES PATENT OFFICE.

RUTHERFORD G. GOLDMAN, OF LOS ANGELES, CALIFORNIA.

ROLLER-BEARING.

1,286,290.  Specification of Letters Patent.  Patented Dec. 3, 1918.

Application filed December 19, 1917. Serial No. 207,932.

*To all whom it may concern:*

Be it known that I, RUTHERFORD G. GOLDMAN, a citizen of the United States, residing at Los Angeles, in the county of Los Angeles and State of California, have invented certain new and useful Improvements in Roller-Bearings, of which the following is a specification.

My invention relates to an improvement in roller bearings, and one of its objects is to eliminate or greatly reduce friction and likewise to produce a bearing of a minimum number of parts, which will accomplish the ends designed for a roller bearing of this particular type.

With the foregoing object in view, my present invention comprises an inner and outer sleeve with an annular space therebetween, in which are contained bearing and spacing rollers alternately arranged, said spacing rollers of greater length and less diameter than the bearing rollers, all of the rollers having conical ends and retaining rings at each end, U-shaped in cross-section, which receive therein the ends of the spacing rollers, taking the end thrust of the latter in their centers, and presenting an overreaching sharp angular edge which receives the conical portion of the bearing rollers and the end thrust thereof, while preventing any of the rollers from falling apart when the outer sleeve is removed.

In the accompanying drawings:

Figure 1 is a longitudinal section; and

Fig. 2 is a transverse section.

The numerals 1 and 2 represent the inner and outer sleeves. These are preferably straight and cylindrical, and the inner sleeve while less in diameter is of slightly greater length than the outer sleeve, and, when assembled, an annular space is left between them.

Bearing rollers 3 fit this space, and the spacing rollers 4 alternately arranged therewith fit the spaces between the bearing rollers, as shown in Fig. 2.

While the bearing rollers are of greater diameter, they are somewhat less in length than the spacing rollers, as shown, and both sets of rollers have conical or truncated conical ends $3^a$ and $4^a$ as shown in Fig. 1.

Retaining rings 5 are each made in a single piece and are U-shaped in cross-section and of sufficient width to receive therein the ends of the spacing rollers 4, as shown in Fig. 1, thereby forming a runner therefor and holding them centered and taking the end thrust thereof in their centers, while the sharp outer angles overreach and take the end thrust of the conical ends $3^a$ of the bearing rollers.

These retaining rings may be either shrunk tight upon the inner sleeve 1 or left free to float.

The washers 6 are secured on the protruding ends of the inner sleeve 1, thereby holding the retaining rings 5 in place.

I claim:

1. A roller bearing comprising inner and outer sleeves with an annular space therebetween, bearing and spacing rollers alternately arranged, and retaining rings constructed and adapted to receive therein between their edges the ends of one set of rollers to take the end thrust thereof, and presenting an edge which takes the end thrust of the other set of rollers, and means for holding said retaining rings in place.

2. A roller bearing made essentially of an inner and outer sleeve with an annular space therebetween, bearing rollers and spacing rollers alternately arranged therein, the spacing rollers of less diameter and greater length than the bearing rollers, and both sets of rollers having tapered ends and retaining rings U-shaped in cross-section located in the ends of the annular space between the inner and outer sleeves, said retaining rings receiving the ends of the spacing rollers in their centers, and their outer angular edges overreaching and receiving the end thrust of the tapering ends of the bearing rollers.

3. A roller bearing comprising inner and outer sleeves, the inner sleeve of greater length than the outer sleeve, bearing and spacing rollers of different diameters and lengths interposed between the two sleeves, said bearing and spacing rollers arranged alternately and each having tapering ends, retaining rings which receive the entire ends of the spacing rollers and which bear upon the tapering portions of the ends of the bearing rollers, and washers secured on the protruding ends of the inner sleeve for holding the retaining rings in place.

In testimony whereof I affix my signature.

RUTHERFORD G. GOLDMAN.